United States Patent [19]

Dufour

[11] Patent Number: 5,148,108
[45] Date of Patent: Sep. 15, 1992

[54] STUD FINDER WITH LEVEL INDICATOR

[75] Inventor: Jean G. Dufour, Quebec, Canada

[73] Assignee: Johnson Level & Tool Mfg. Co., Inc., Meguon, Wis.

[21] Appl. No.: 669,389

[22] Filed: Mar. 14, 1991

[51] Int. Cl.⁵ .......................... B43L 7/00; G01C 9/00; G01C 17/02
[52] U.S. Cl. ................................... 324/226; 324/228; 324/67; 33/451; 33/355 R; 33/365
[58] Field of Search ............... 324/66, 67, 228, 226, 324/262; 33/332, 347, 348, 348.2, 350, 351, 352, 353, 354, 355 R, 364, 365, 374, 377, 379, 403, 451, 483, 484, 485

[56] References Cited

U.S. PATENT DOCUMENTS

| | | |
|---|---|---|
| 1,971,189 | 8/1934 | Leibing . |
| 2,346,773 | 4/1944 | McBride et al. ...................... 324/67 |
| 2,670,457 | 2/1954 | Hartman et al. . |
| 2,721,973 | 10/1955 | Armour . |
| 2,723,369 | 11/1955 | Brummett . |
| 2,933,679 | 4/1960 | Bray . |
| 3,225,451 | 12/1965 | Olexson et al. ................... 33/384 X |
| 3,363,208 | 1/1968 | Balet . |
| 3,541,438 | 11/1970 | Wadley et al. . |
| 3,845,384 | 10/1974 | Stoutenberg et al. . |
| 4,013,291 | 3/1977 | Brass et al. . |
| 4,634,974 | 1/1987 | Hunter . |
| 4,700,489 | 10/1987 | Vasile ............................... 33/451 X |
| 4,896,131 | 1/1990 | Podlesny et al. . |
| 4,944,096 | 7/1990 | Tolley ............................... 33/451 X |

*Primary Examiner*—Kenneth A. Wieder
*Assistant Examiner*—Warren S. Edmonds
*Attorney, Agent, or Firm*—Andrus, Sceales, Starke & Sawall

[57] ABSTRACT

A stud finder includes a magnetic subassembly for detecting the presence of a ferrous metal object, such as the head of a nail or screw, in a wall, with the magnetic subassembly being mounted at one end of a base member. A level vial is mounted at the other end of the base member, and a slot is formed in the base member between the magnetic subassembly and the level vial. When the base member is placed against a wall and the presence of a stud is detected by the magnetic subassembly, the base member is moved to a position in which the level vial indicates level. The slot has its longitudinal axis oriented perpendicular to the longitudinal axis of the level vial, so that the user can place a vertical mark on the wall through the slot. The slot is oriented so as to be in vertical alignment with the nail or screw head, when the base member is moved such that the magnetic subassembly is directly over the nail or screw head. With this arrangement, the mark made on the wall by the user is vertically aligned with the nail or screw head.

7 Claims, 3 Drawing Sheets

STUD FINDER WITH LEVEL INDICATOR

BACKGROUND AND SUMMARY

This invention relates to a stud finder.

A stud finder typically employs a magnetic element which senses the presence of a ferrous metal object, such as the head of a nail or screw, in a wall. The presence of a nail or screw typically indicates the location of a stud in the wall. Stud finders of this type are shown in U.S. Pat. Nos. 3,845,384, 2,933,679 and 4,896,131.

Stud finders typically include a marking groove or notch at one or more of its outer edges, so that the user can mark the wall after the location of the stud has been determined. This type of arrangement does not provide a great deal of accuracy in marking the wall at a point corresponding to the location of the head of the nail or screw.

It is an object of the present invention to provide a stud finder which allows a user to accurately mark the wall in a location corresponding to the location of the head of the nail or screw. It is a further object of the invention to provide a stud finder with a level indicating feature to assist in accurately marking the location of the stud, in which the level indicating feature is inexpensive in construction and does not significantly add to the cost of manufacture of the stud finder.

In accordance with one aspect of the invention, a stud finder includes a base member, and a magnetic subassembly mounted to the base member which detects the presence of a ferrous metal object in a wall when the base member is positioned thereagainst. A level indicator is mounted to the base member, for indicating the position of the base member relative to vertical when the presence of a nail or screw head is detected by the magnetic subassembly. A vertical slot is formed in the base member, and defines a linear marking edge. When the location of a stud is determined by use of the magnetic subassembly, the base member is moved on the wall until the level indicator reads level. The marking edge is thus positioned vertically, and is employed by the user to make a mark on the wall. In a preferred embodiment, the location of the marking edge is such that it is in vertical alignment with the magnetic subassembly. Accordingly, when the magnetic subassembly detects the presence of a nail or screw head and the base member is moved so as to indicate level on the level indicator, the marking edge is vertically aligned with the nail or screw head, and the mark made by the user is in vertical alignment with the nail or screw head. In this manner, the location of the stud within the wall can be accurately marked by the user.

The level indicator preferably comprises a level vial mounted to the base member so as to be clearly visible by the user when a rear surface of the base member is placed against the wall. The level vial is oriented such that its longitudinal axis is perpendicular to the linear marking edge defined by the slot formed in the base member. In a preferred form, the magnetic subassembly is mounted at one end of the base member and the level vial at the other, with the slot located between the magnetic subassembly and the level vial.

The invention also contemplates a method of marking the location of a stud in a wall, substantially in accordance with the foregoing summary.

Various other features, objects and advantages of the invention will be made apparent from the following description taken together with the drawings.

BRIEF DESCRIPTION OF THE DRAWINGS

The drawings illustate the best mode presently contemplated of carrying out the invention.

In the drawings.

DETAILED DESCRIPTION OF THE PREFERRED EMBODIMENT

Figure 1:
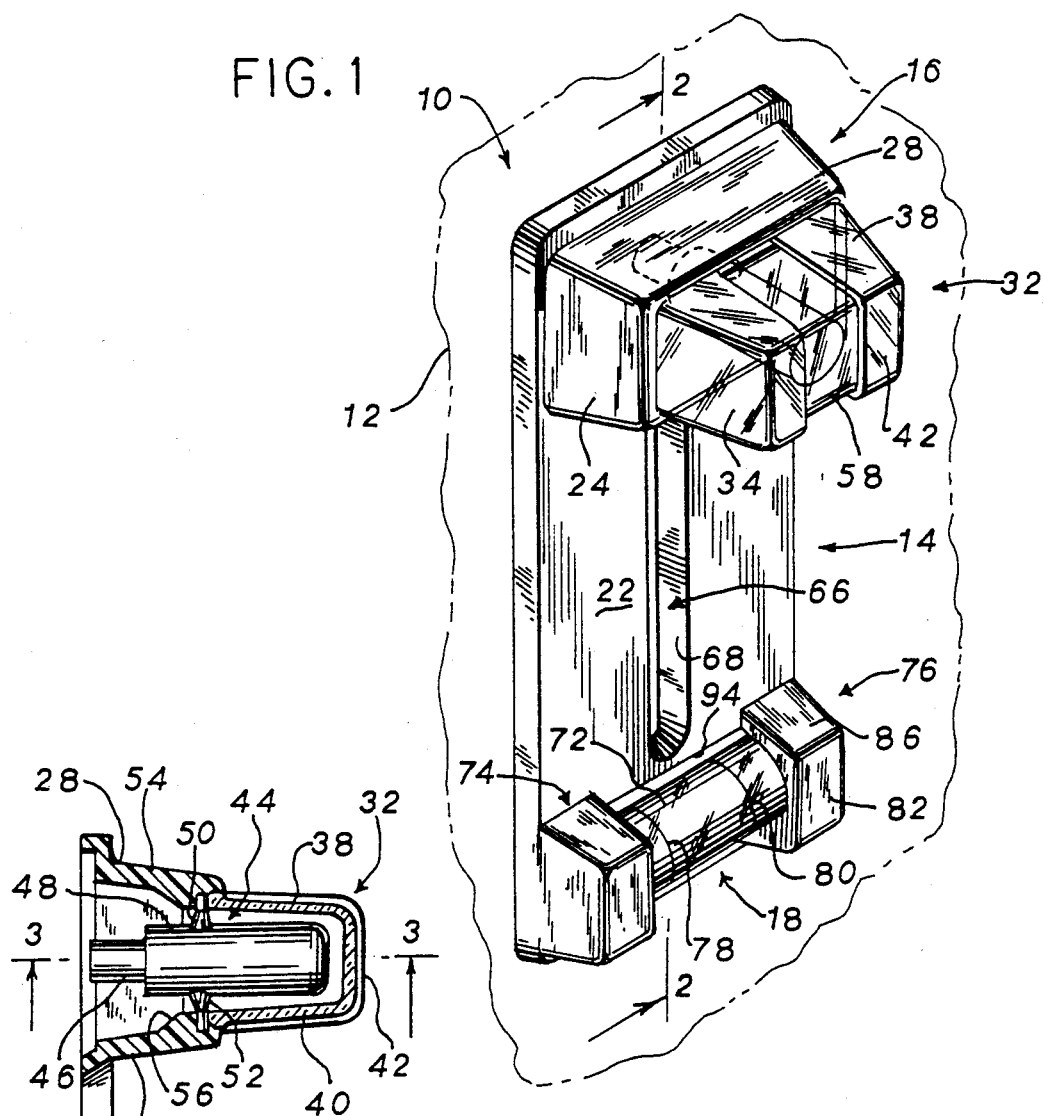
FIG. 1 is an isometric view of a stud finder constructed according to the invention.

Referring to FIG. 1, a stud finder 10 constructed according to the invention is shown placed against the surface of a wall 12. Stud finder 10 generally includes a plate-like rectangular base member 14, an upper housing 16 in which a magnetic stud-locating subassembly is enclosed, and a level indicator 18 mounted to the lower end of base member 14. When stud finder 10 is in use, the rear surface 20 of base member 14 is placed against wall 12 and the front surface 22 of base member 14 faces the user.

Figure 2:
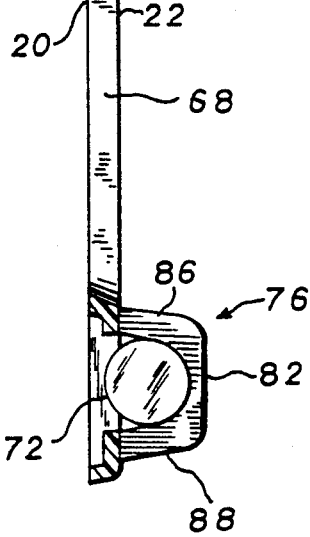
FIG. 2 is a section view taken generally along line 2—2 of FIG. 1.
Figure 3:
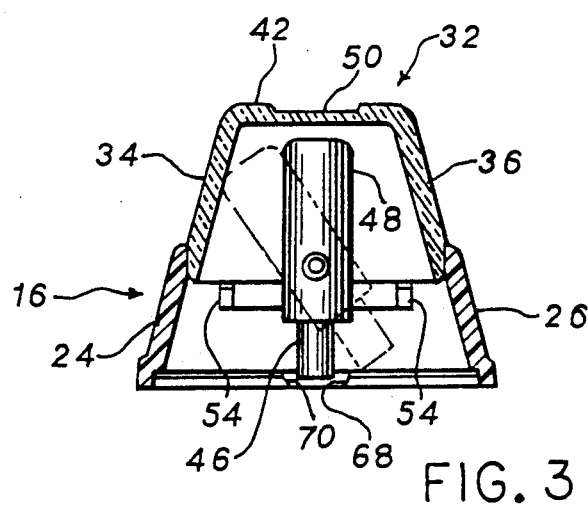
FIG. 3 is a section view taken generally along line 3—3 of FIG. 4.

As shown in FIGS. 1-3, base member 14 is formed such that a rearwardly facing opening is formed in base member 14 at upper housing 16. The opening in base member 14 opens into the interior of a cavity defined by a pair of upper housing side walls 24 and 26 (FIGS. 1, 3), an upper wall 28 and a lower wall 30. Walls 24-30 terminate in a forward opening, in which a transparent cover member 32 is positioned.

Cover member 32 is defined by side walls 34, 36, top wall 38, bottom 40 and front wall 42. The rear ends of cover member walls 34-40 are engageable with the outer ends of upper housing walls 24-30, to secure cover member 32 within the opening defined by the outer ends of housing walls 24-30. This construction allows the user to view the position of a magnetic subassembly, shown generally at 44, through cover member 32 when stud finder 10 is placed against wall 12.

Still referring to FIGS. 1-3, magnetic subassembly 44 comprises a magnet 46 mounted within a cylindrical magnet holder 48. Upper and lower mounting projections 50, 52 extend from the side wall of magnet holder 48. Projections 50, 52 are disposed within slots formed in the rear ends of cover member upper and lower walls 38, 40, respectively, so as to provide pivotable mounting of magnet holder 48 within an internal cavity defined by upper housing 16 and cover member 32. As shown in FIG. 2, the outer ends of mounting projections 50 are placed against outwardly facing shoulders defined by a pair of inwardly extending protrusions 54, 56 provided on housing upper and lower walls 28, 30, respectively. A series of protrusions 54, 56 are provided along the length of upper and lower housing walls 28, 30 respectively. When the outer ends of cover member walls 34-40 are engaged within the opening defined by the outer ends of housing walls 24-30, the outer ends of mounting projections 50, 52 are captured between the shoulders formed by protrusions 54, 56 and the ends of the slots formed in upper and lower walls 38, 40 of cover member 32, to allow pivoting movement of magnet holder 48. In this manner, when base portion rear surface 20 is placed against wall 12, the presence of a ferrous metal object in the wall, such as the head of a nail or screw, is detected by attracting magnet 46. The location of the ferrous metal object is pinpointed when magnet holder 48 is pivoted to a position in which the end of magnet holder 48 is aligned with a depression, shown at 58, formed in cover member wall 42.

FIG. 3 illustrates the range of pivoting movement of magnet holder 48 within the internal cavity defined by cover member 32 in combination with housing 16. The phantom line representation of magnet holder 48 and magnet 46 shows these components pivoted in a counterclockwise direction in which the outer end of magnet holder 48 is engaged with the inner surface of cover member wall 34. Magnet holder 48 is pivotable in a clockwise direction until the end of magnet holder 48 engages the inner surface of cover member wall 36. The solid line representation of magnet 40 and magnet holder 48 show the position in which magnet 46 is positioned directly over the nail or screw head, in which the end of magnet holder 48 is aligned with recessed area 58 of cover member front wall 42.

Figure 7:
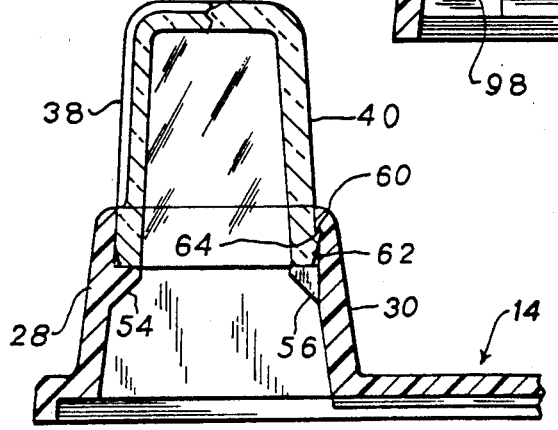
FIG. 7 is a partial section view taken generally along line 7—7 of FIG. 4.

FIG. 7 illustrates the manner in which cover member 32 is connected to housing 16. As noted, several of protrusions 54, 56 are formed on upper and lower housing walls 28, 30, respectively, and the ends of cover member upper and lower walls 38, 40, respectively, are engaged with the shoulders formed by protrusions 54, 56. Walls 28 and 30 are provided with rearwardly facing lips adjacent their outer ends, one of which is shown on wall 30 at 60. The ends of cover member walls 38, 40 are provided with ramped surfaces, such as shown at 62, which terminate in forwardly facing shoulders 64. When cover member 32 is inserted into the opening defined by the outer ends of housing walls 24-30, the ramped surfaces, such as 62, engage the outer ends of walls 28, 30 and deflect walls 28, 30 outwardly until the shoulders formed by protrusions 54, 56 are engaged. When this occurs, the forwardly facing cover member shoulders, such as 64, interlock with the rearwardly facing lips, such as 60, formed on housing walls 28, 30 by means of the outer ends of walls 28, 30 returning to their original positions. In this manner, cover member 32 is securely engaged with walls 24-30 of upper housing 16.

A slot 66 is formed in the central portion of base member 14, and defines a pair of angled side walls 68, 70 extending between rear and front surfaces 20, 22 of base member 14. At rear surface 20 of base member 14, side walls 68, 70 define a pair of linear marking edges with a space disposed therebetween. The space between the linear marking edges is adapted to receive the tip of a marking instrument, such as a pencil or the like, to allow the user to strike a mark on wall 12 when the location of a stud in wall 12 is detected by magnetic subassembly 44.

Slot 66 in base member 14 is oriented such that its longitudinal axis is perpendicular to the longitudinal axis of magnet 46 when magnet holder 48 is in its solid line position shown in FIG. 3. That is, when the longitudinal axis of magnet holder 48 is perpendicular to the surface of wall 12 against which base member 14 is placed, the longitudinal axis of slot 66 is oriented perpendicular to that of magnet holder 48 and magnet 46.

Level indicator 18 comprises a level vial 72, which is mounted at its ends to a pair of spaced vial holders 74, 76 formed at the lower end of base member 14. Vial holders 74, 76 are arranged such that when vial 72 is mounted to vial holders 74, 76, in a manner to be explained, the longitudinal axis of vial 72 is perpendicular to that of slot 66, and substantially the entire central portion of vial 72 is visible by the user when rear surface 20 of base member 14 is placed against wall 12. In this manner, the location of the bubble (not shown) associated with vial 72 relative to a pair of level indicator marks 78, 80, can be observed.

Vial holders 74, 76 are identical in construction and in the manner in which they engage the ends of vial 72, and will be explained in detail with reference to FIGS. 1, 2 and 4-6.

Vial holder 76 includes a front wall 82, an end wall 84 (FIG. 6), and top and bottom walls 86, 88, respectively. Walls 82-88 cooperate to define a rearwardly opening internal cavity, which is also open toward vial holder 74. A pair of rearwardly extending arms 90, 92 (FIG. 5) are formed integrally with walls 82, 86 and 88, and define a rearwardly opening vial-receiving cavity therebetween. The vial-receiving cavity defined by arms 92, 94 has a radius substantially equal to the outside radius of vial 72, and each of arms 92, 94 engage the outer wall of vial 72 throughout an arc of approximately 130°. In this manner, arms 92, 94 engage vial 72 throughout approximately 260° of the circumference of vial 72. Vial 72 is placed within the vial-receiving recess by first engaging vial 72 with the outer ends of arms 92, 94, and then pushing vial 72 forwardly into the vial-receiving cavity formed between arms 92, 94. The outer ends of arms 92, 94 deflect outwardly during the push-on insertion of vial 72 into the vial-receiving cavity, and thereafter return to their original position to engage vial 72 and to securely retain it in position within housing 76.

A slot 94 (FIG. 1) is formed in the lower end of base member 14 between vial holders 74, 76 to accommodate passage of vial 72 into vial holders 74, 76.

As noted previously, vial holder 74 is constructed similarly to vial holder 76, and the other end of vial 72 is engaged with vial holder 74 in the same manner as described previously with respect to vial holder 76.

Figure 4:
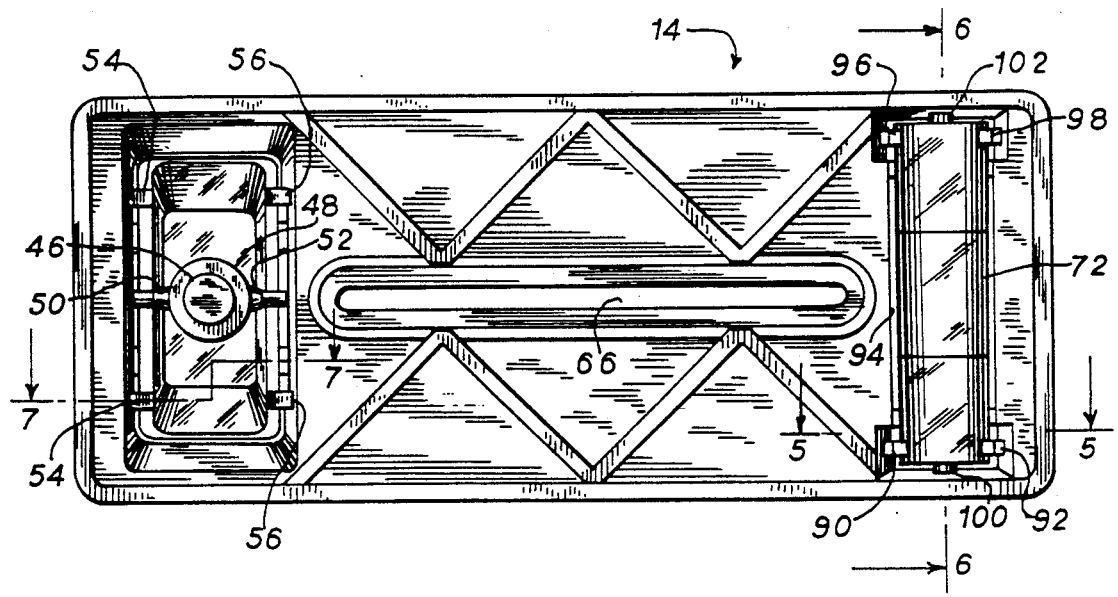
FIG. 4 is a rear elevation of the stud finder of FIG. 1.
Figure 6:
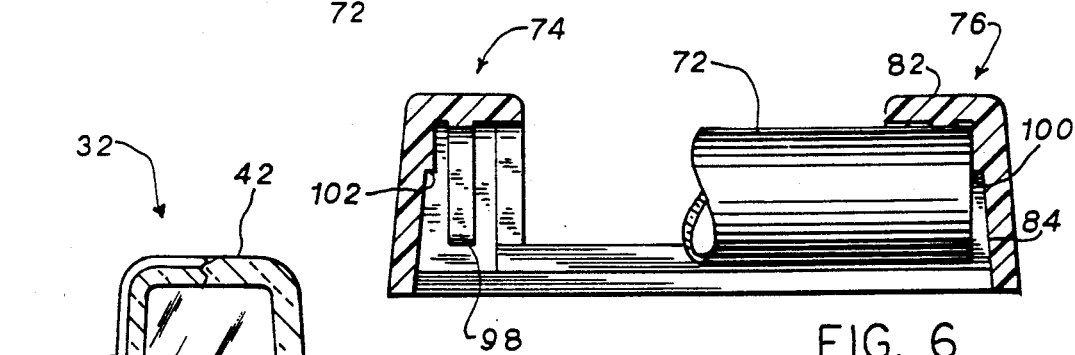
FIG. 6 is a section view taken generally along line 6—6 of FIG. 4.

Referring to FIGS. 4 and 6, vial holder 74 includes a pair of arms 96, 98 constructed the same as arms 90, 92 of vial holder 76, to engage the end of vial 72 located within the interior of vial holder 74.

Figure 5:
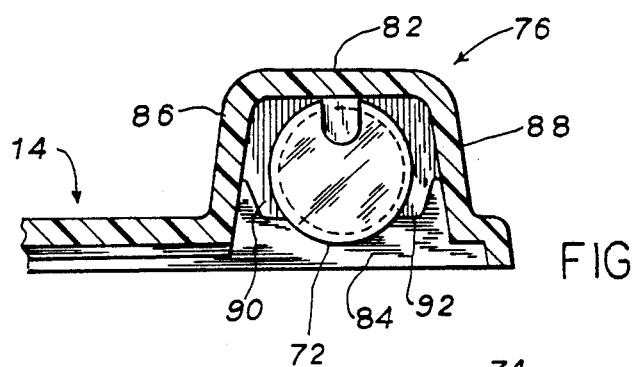
FIG. 5 is a partial section view taken generally along line 5—5 of FIG. 4.

Referring to FIGS. 4-6, end wall 84 of vial holder 76 is provided with a molded boss 100 and the end wall of vial holder 74 is similarly provided with a molded boss 102. Bosses 100, 102 engage the ends of vial 72 when vial 72 is mounted within vial holders 74, 76, to prevent lateral movement of vial 72 after mounting.

In use, stud finder 10 is first placed on wall 12 and moved thereon in a manner as described previously, until magnetic subassembly 44 detects the head of a nail or screw, thereby causing pivoting movement of magnetic subassembly 44 within the cavity defined by upper housing 16 and cover member 32. Stud finder 10 is then moved until the end of magnet holder 48 is aligned with depression 58 formed in cover member 32. When stud finder 10 is in this position, the longitudinal axis of magnet 46 and magnet holder 48 is approximately coincident with the center of the nail or screw head. The user then moves stud finder 10 on wall 12 until the bubble of vial 72 is centered between lines 78 and 80 on vial 72, while maintaining the upper portion of stud finder 10 in position over the center of the nail or screw head. After stud finder 10 is moved to a position in which the bubble indicates level, the user strikes a mark on wall 12 through slot 66. The mark is thus vertically aligned with the center line of the nail or screw.

Base member 14 has a width of 1⅜ inches, which is the standard thickness of a 2"×4" stud. This feature allows a user to locate and mark the edges of the stud along the vertical edges of base member 14, once the centerline of the stud has been located as described above.

Figure 8:
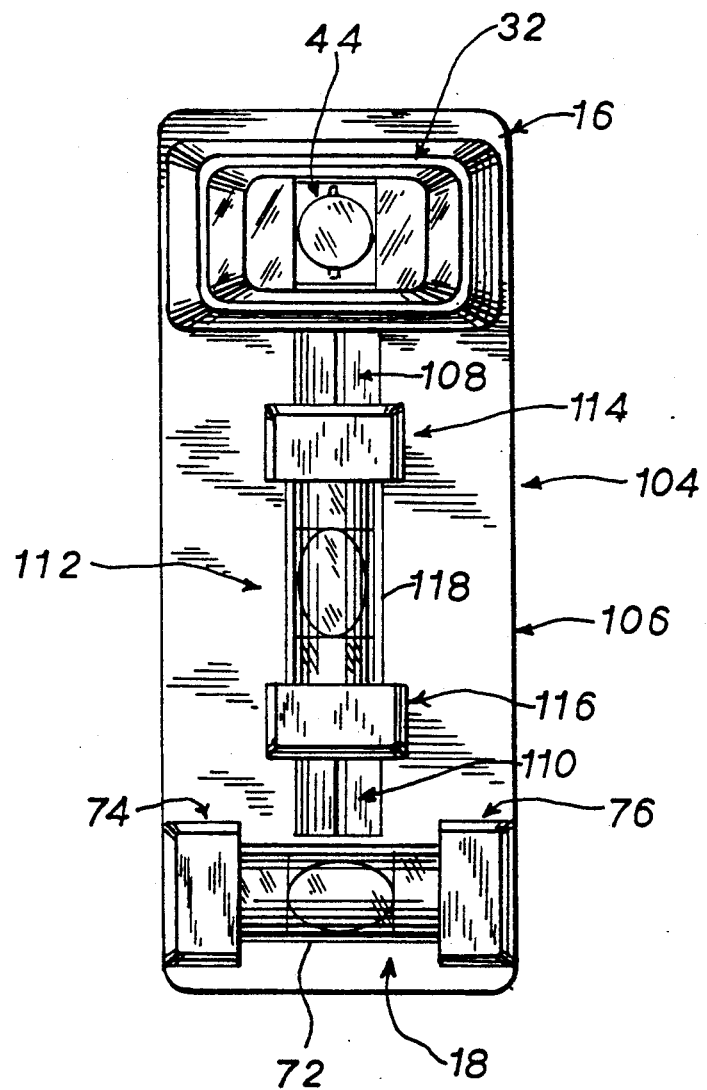
FIG. 8 is a front elevation view of another embodiment of the stud finder of the invention.

FIG. 8 illustrates a stud finder 104 which includes an upper housing 16 and lower level indicator 18 identical to that provided on stud finder 10. Like stud finder 10, stud finder 104 includes a pair of vial holders 74, 76 which retain a vial 72 in position toward the lower end of stud finder 104. Similarly, upper housing 16 and cover member 32 define an internal cavity in which magnetic subassembly 44 is located.

In the embodiment of FIG. 8, base member 106 of stud finder 104 includes a pair of slots 108, 110 extending between the front and rear surfaces thereof, with a level indicator 112 being disposed therebetween. Level indicator 112 comprises an upper vial holder 114 and a lower vial holder 116, which are constructed the same as vial holders 74, 76, to retain a vial 118 in position. The longitudinal axis of vial 118 is perpendicular to that of vial 72. Stud finder 104 is employed in the same manner as described previously to allow a user to place vertical marks on the wall through slots 108, 110 when the presence of a stud is detected by magnetic subassembly 44. If desired, the user can locate a straightedge through the marks made through slots 108, 110, to provide an extended vertical mark on the wall.

Stud finder 104 can also be employed as a cross-check level. When the rear surface of base member 106 is placed on an upwardly or downwardly facing horizontal surface, vials 72 and 118 are employed to level the surface in two directions. This construction allows stud finder 104 to be used in two different applications, while providing a relatively minimal increase in its cost of manufacture over stud finder 10.

Various alternatives and embodiments are contemplated as being within the scope of the following claims, particularly pointing out and distinctly claiming the subject matter regarded as the invention.

I claim:

1. A stud finder, comprising:
   a base member defining a front surface and a rear surface adapted for placement against a wall;
   a magnetic subassembly mounted to the base member for detecting a point at which a stud is located in a wall by detecting the presence of a ferrous metal object; and
   a level vial mounted to the base member for providing an indication to the user of the orientation of the base member relative to vertical from the point at which the stud is located, wherein the level vial is mounted to the base member such that a central portion of the vial is visible when the rear surface of the base member is placed against a wall, and wherein the vial is mounted to the base member by means of a pair of spaced apart vial mounting structures provided on the base member, for engaging the ends of the vial and securing the vial to the base member, each vial mounting structure comprising a pair of walls extending forwardly from the front surface of the base member and defining an open cavity which opens onto the rear surface of the base member, the cavity being adapted to receive an end portion of the vial, and further comprising vial securing means provided in each cavity for securing the end portion of the vial within the cavity.

2. The stud finder of claim 1, wherein the pair of walls comprise an upper wall and a lower wall projecting forwardly from the front surface of the base member, and further comprising a front wall extending between the upper and lower walls.

3. The stud finder of claim 1, wherein the vial securing means comprises a pair of spaced apart resilient arms disposed within each cavity, wherein the resilient arms flex during insertion of the vial into the cavity in a rear-to-front direction through the opening of the cavity onto the rear surface of the base member and thereafter engage the vial to maintain it in position within the cavity.

4. A stud finder, comprising:
   a base member defining a first end and a second end;
   a magnetic subassembly pivotably mounted to the base member toward its first end for movement about a pivot axis, for detecting a point at which a stud is located in a wall by detecting the presence of a ferrous metal object;
   a level vial mounted to the base member toward its second end; and
   an elongated marking slot formed in the base member between the magnetic subassembly and the level vial, the slot extending along an axis oriented perpendicular to the longitudinal axis of the level vial and being located in a predetermined position relative to the pivot axis of the magnetic subassembly;
   wherein the level vial enables a user to position the base member such that the slot is vertical when the location of a stud is determined by the magnetic subassembly, and to strike a vertical mark on the wall along the elongated slot.

5. The stud finder of claim 4, wherein the base member has a width substantially equal to the thickness of a stud to thereby allow the user to mark the edges of the stud along the edges of the base member.

6. The stud finder of claim 4, further comprising a second level vial mounted to the base member, wherein the first-mentioned and second vials are arranged substantially perpendicular to each other, so that the stud finder is usable as a cross-check level when the base member is place on a horizontal surface.

7. A stud finder, comprising:
   a base member defining a first end and a second end;
   a magnetic subassembly pivotably mounted to the base member toward its first end for movement about a pivot axis, for detecting a point at which a stud is located in a wall by detecting the presence of a ferrous metal object;
   a level vial mounted to the base member toward its second end; and
   an elongated internal marking slot formed in the base member between the magnetic subassembly and the level vial, the slot extending along an axis oriented perpendicular to the longitudinal axis of the level vial and being coincident with the pivot axis of the magnetic subassembly;
   wherein the level vial enables a user to position the base member such that the slot is vertical and in line with the pivot axis of the magnetic subassembly when the location of a stud is determined thereby, and to strike a vertical mark on the wall along the elongated slot and in line with the ferrous metal object.

* * * * *